3,362,835
SPRAY FREEZE DRYING SYSTEM
Erik Thuse, San Jose, Lewis F. Ginnette, Cupertino, and Robert R. Derby, Rio Oso, Calif., assignors to FMC Corporation, San Jose, Calif., a corporation of Delaware
Filed Jan. 15, 1964, Ser. No. 337,889
1 Claim. (Cl. 99—199)

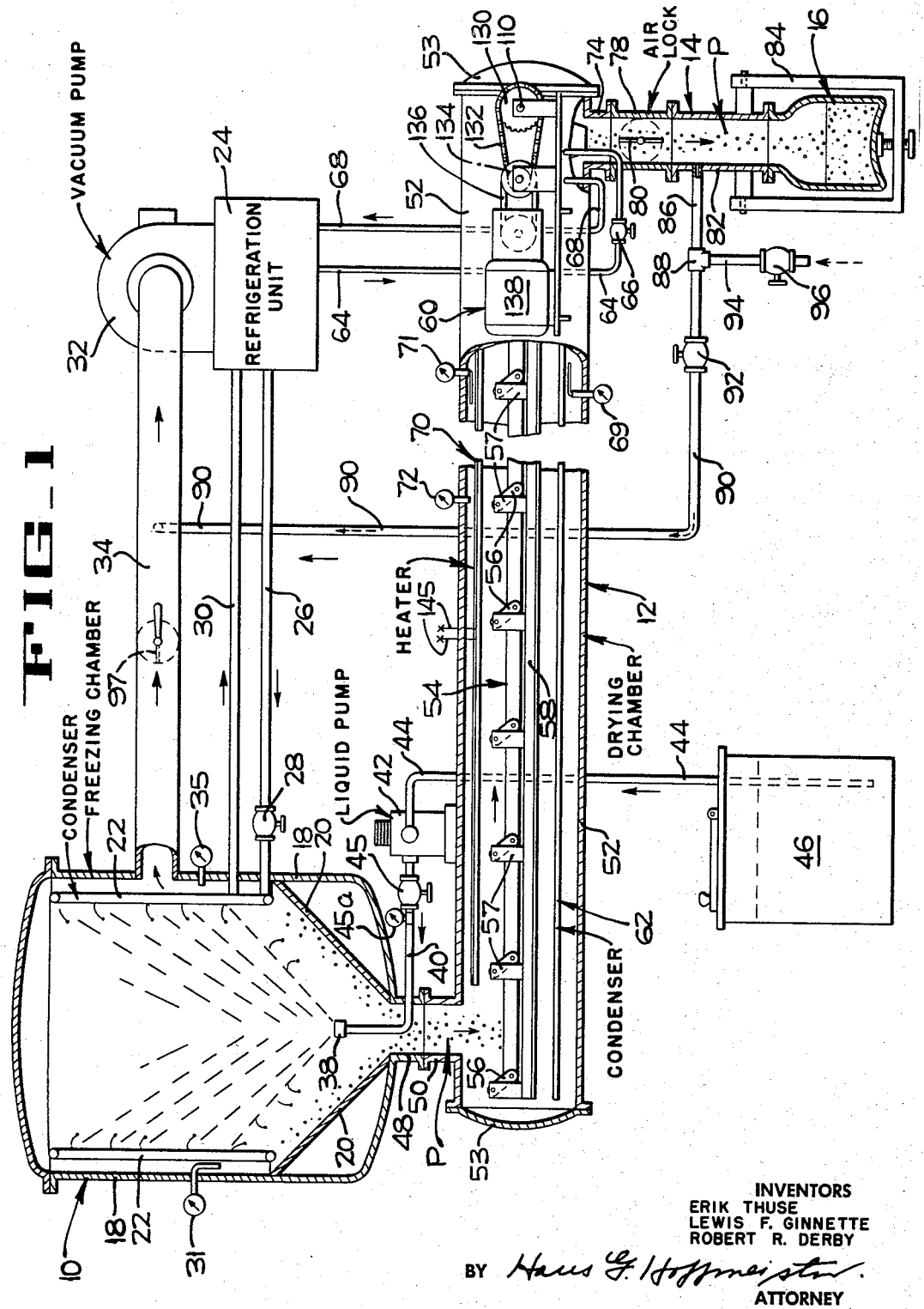

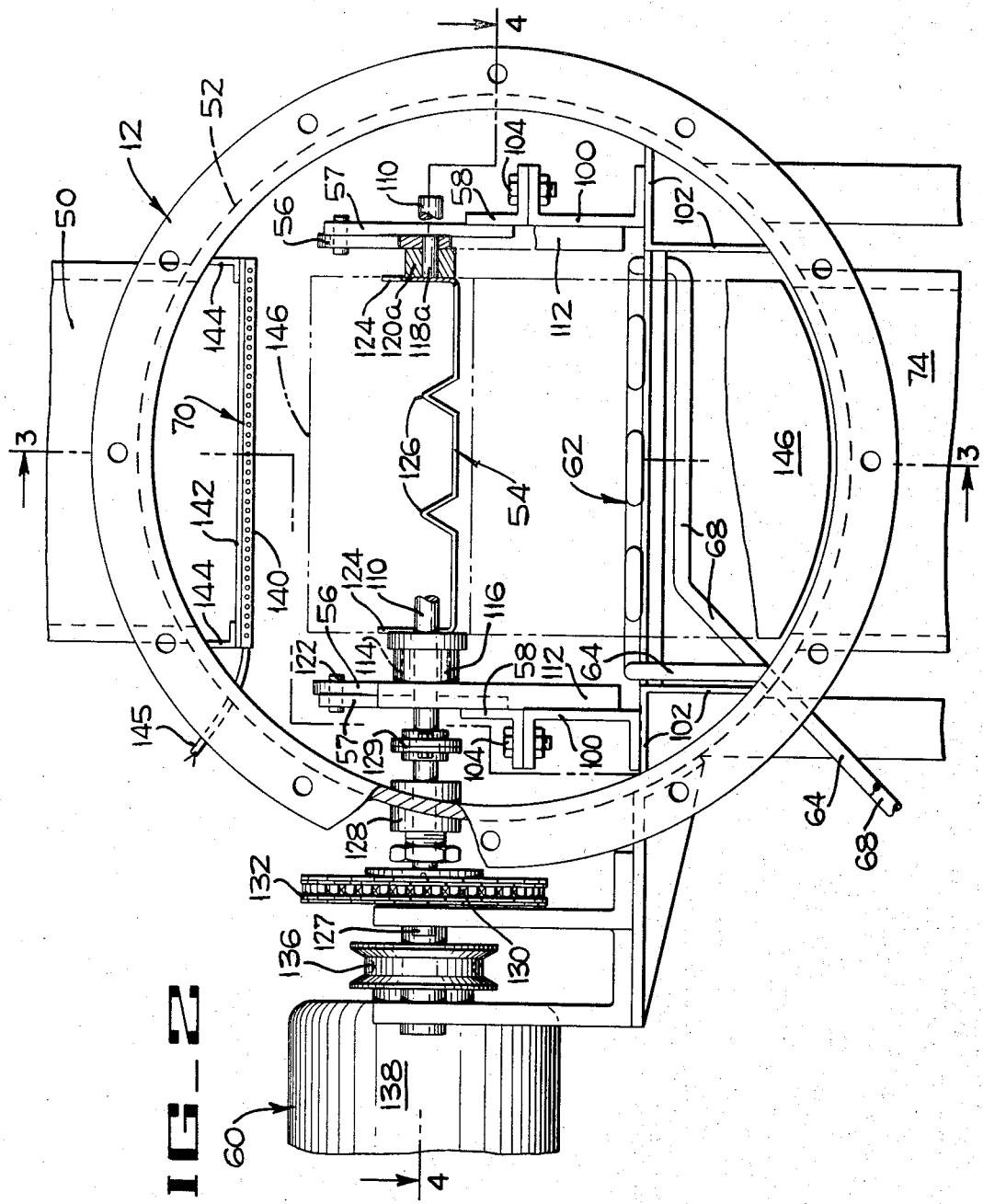

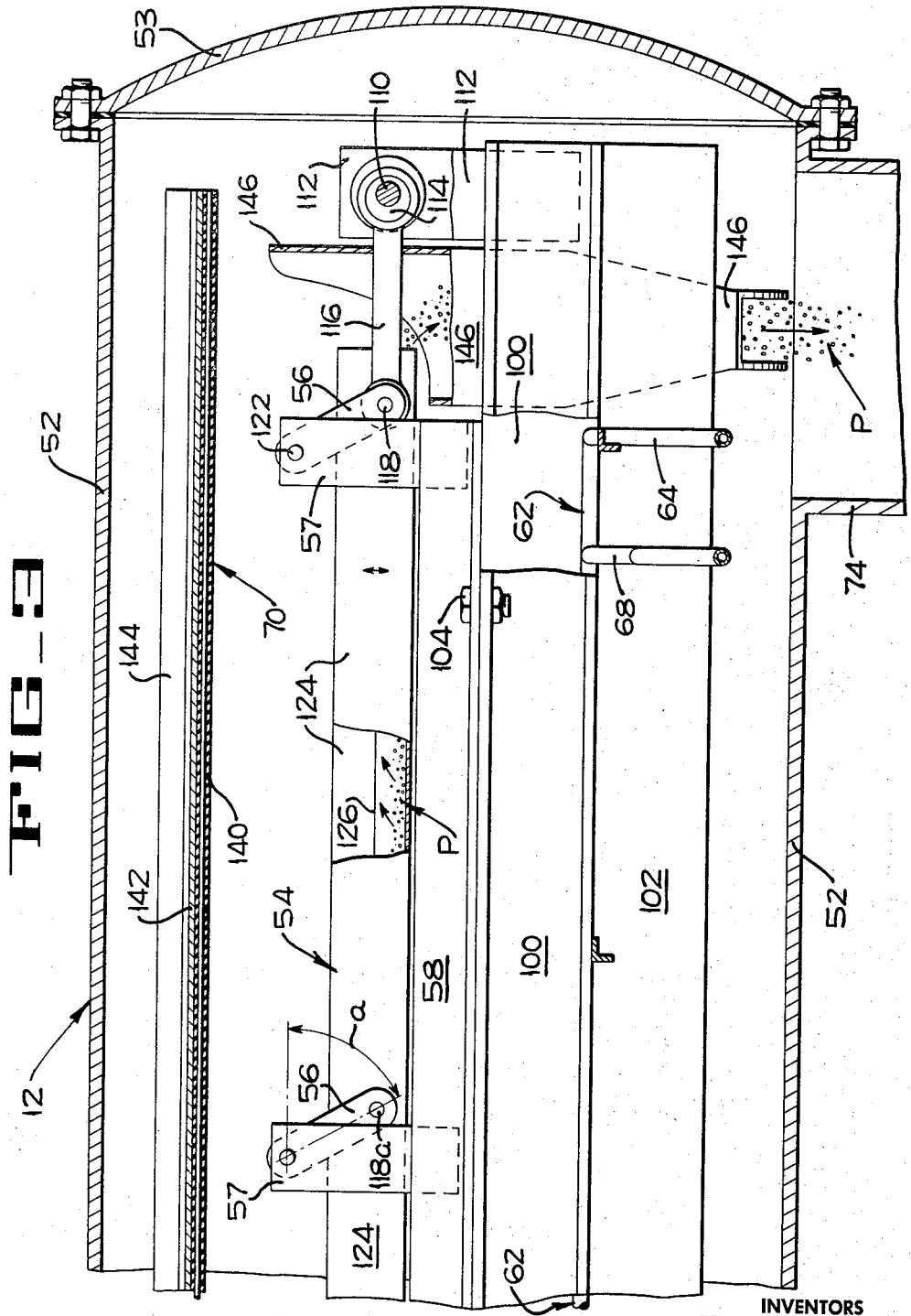

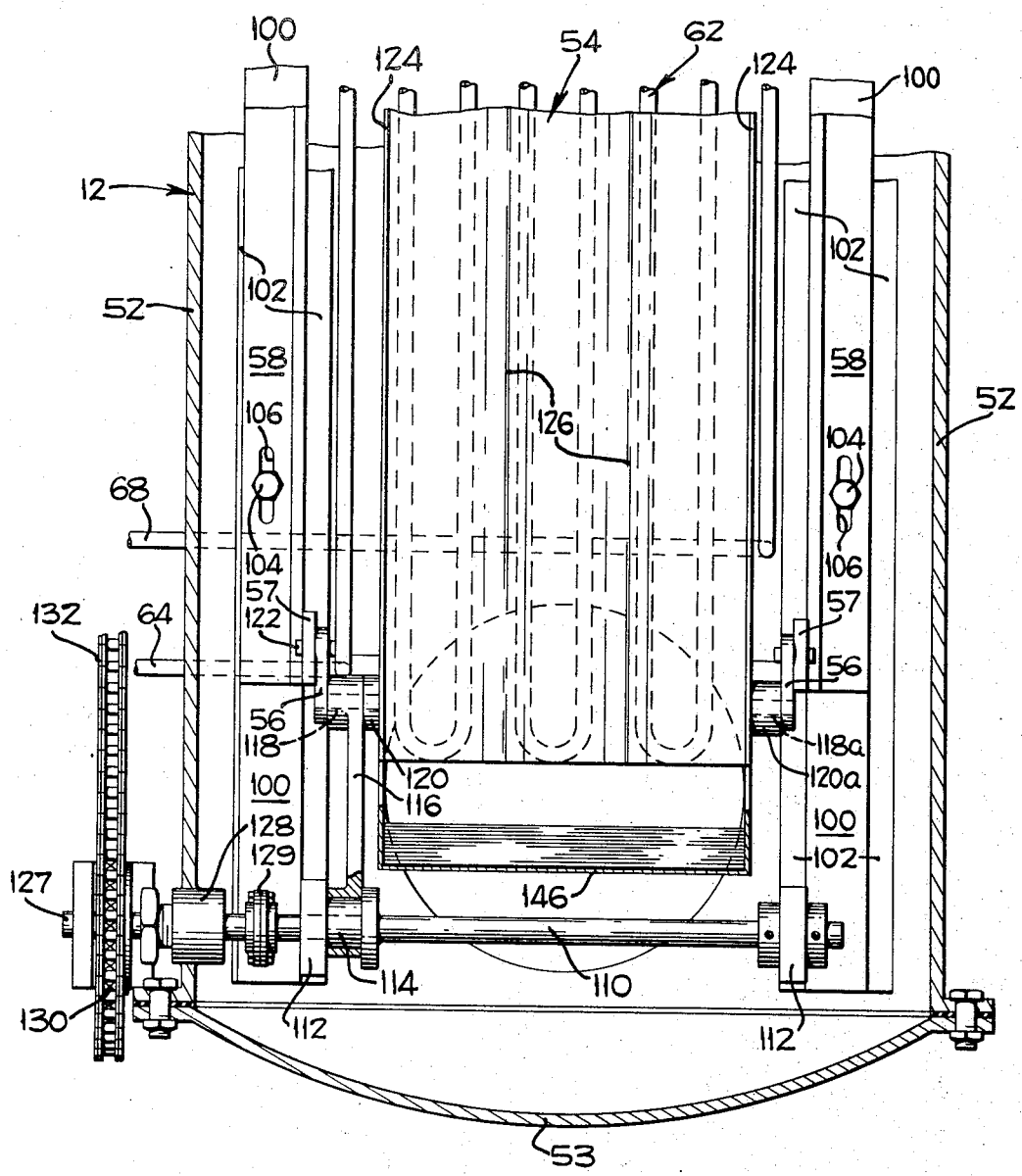

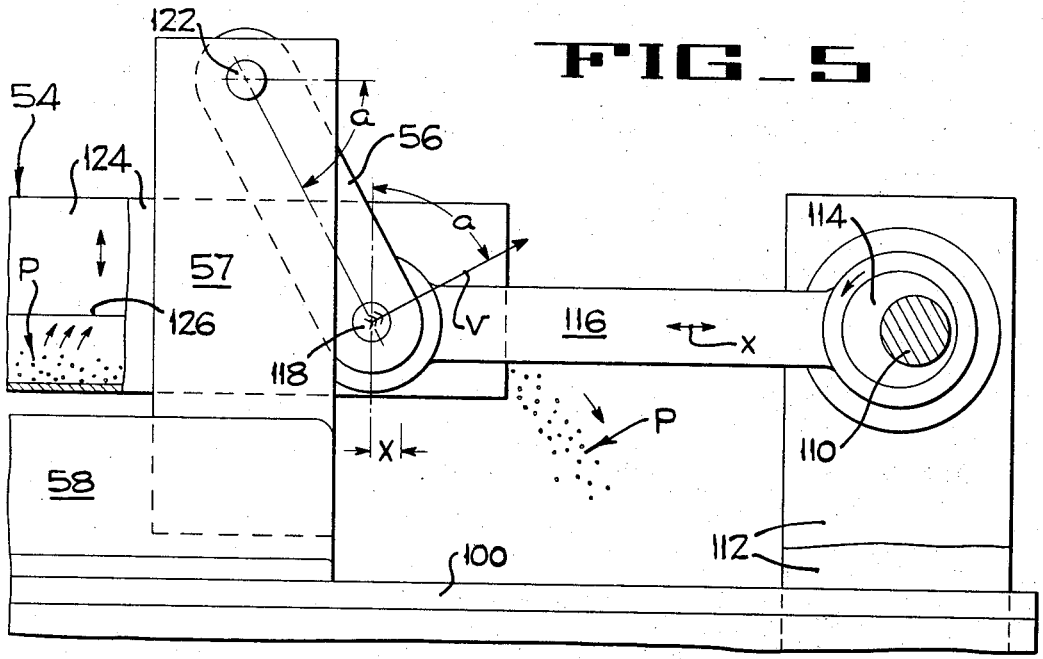
FIG_5
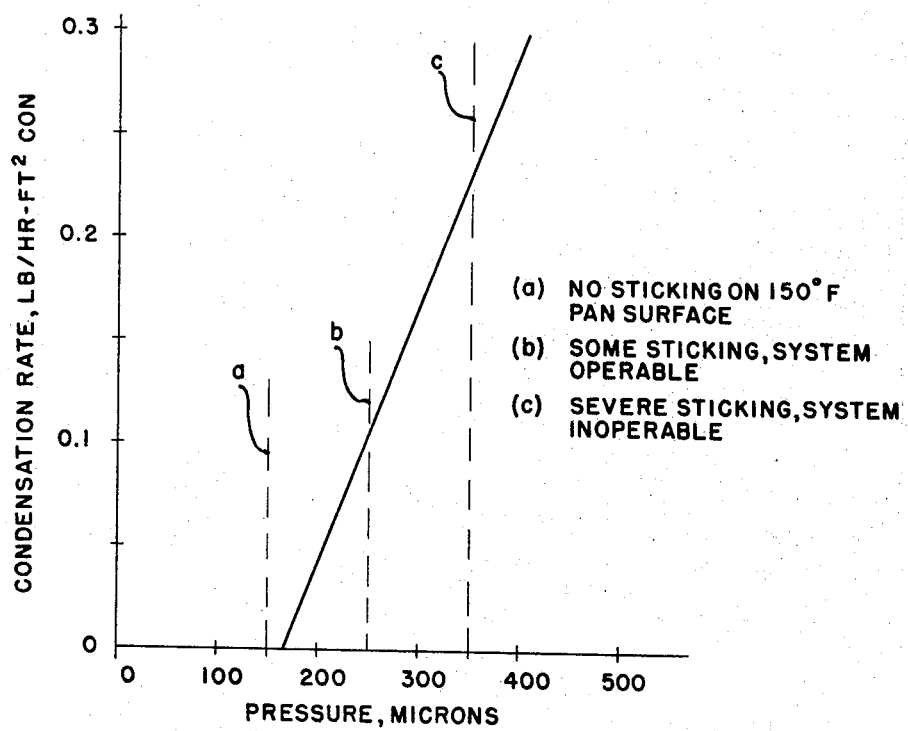
FIG_6

ABSTRACT OF THE DISCLOSURE

Coffee extract is continuously dried into instant coffee by spraying the extract into a directly condensing vacuum freezing chamber so that the spray freezes in transit, conducting the frozen particles through a directly condensing vacuum drying chamber which also contains the heat source, and removing the dried product from the drying chamber.

---

This invention relates to freeze drying, and more particularly to a spray freeze drying system wherein solids containing liquid is pressure sprayed into a vacuum freezing chamber, whereupon the atomized droplets of liquid freeze and fall as frozen particles into a vacuum drying chamber. Perfectly dry particles of the solids emerge from the drying chamber, without having been wet during the drying process.

When employed with substances amenable to spray-freeze drying treatment, such as coffee extract, fruit juices, biologicals, and the like, the spray freezing process, when followed by freeze drying provides a number of advantages. In the first place, handling costs are reduced, because the process lends itself to continuous operation. No loading trays or the like are required, because the solid-bearing liquid is pumped continuously into the freezing chamber. The dried particles, which can have a very fine texture, reconstitute with water to provide a product superior in taste to similar products dried by other processes. With the system of the present invention the total time during which the product is under treatment, commonly referred to as the "residence time," is but a fraction of the residence time employed in other freeze drying processes. Since during the drying process, the ice core becomes surrounded with a shell of dried solids, if this material is heat sensitive (and heat must be supplied to reduce the residence time to a commercially acceptable value) then undue prolongation of the residence or treatment time may result in partial deterioration of certain qualities of the dry product, such as taste, enzyme content, or the like.

The spray freeze drying system of the present invention is essentially a one step process, in that the solids-bearing liquid is spray frozen in one unit of the system, whereupon the frozen particles pass directly to a freeze drying unit of the system, and hence out of the system through an air lock.

It is an object of the present invention to reduce the residence time in a freeze drying system.

A further object is to reduce the holding refrigeration and insulation requirements of the system.

Another object is to provide a spray freeze drying system which is compatible with continuous operation.

It is also an object of the present invention to reduce the amount of refrigeration required in a freeze drying system, for a given weight of water that must be removed during the process.

It is a further object to provide a freeze drying system wherein the frozen particles do not adhere to various parts of the system during the drying process.

Another object of the invention is to provide a freeze drying unit that includes a specially constructed vibratory conveyor which minimizes drying time, and prevents adhering of the frozen particles to the conveying surfaces.

A further object of the present invention is to eliminate the need of a pre-freezing, pulverizing or other pre-treatment of the material preparatory for the freeze drying process.

It is also an object of the present invention to provide a freeze drying system wherein there is no entrainment of the small discrete particles of frozen liquid by vapor flow from the drying to the freezing chamber during the freeze drying process.

It is also an object of the present invention to provide an improved spray freeze drying system for the drying of coffee extract, for the production of instant coffee.

Another object is to provide improved instant coffee.

The manner in which these and other objects of the invention may be attained by one skilled in the art, will be apparent from the following detailed description of the invention.

In the drawings:

FIGURE 1 is a diagram of a spray freeze drying system embodying the present invention.

FIGURE 2 is an end view of the drying chamber with the end plate removed.

FIGURE 3 is a vertical section through the drying chamber, taken on lines 3—3 of FIGURE 2.

FIGURE 4 is a horizontal section through the drying chamber, taken on lines 4—4 of FIGURE 2. Both FIGURES 3 and 4 show only the delivery end of the drying chamber.

FIGURE 5 is an enlarged diagram showing the geometry of the vibrating conveyor.

FIGURE 6 is a curve, showing the relationship between the pressure in the drying chamber of the system and the condensation rate, and giving critical conditions relative to adherence of the particles to the conveyor.

The basic elements of the freeze drying system of the present invention are illustrated diagrammatically in FIG. 1. The major elements of the system include a freezing chamber 10 connected to a drying chamber 12, the outlet of which is connected to an airlock 14, that delivers dried material to a receptacle 16.

The freezing chamber 10 includes a pressure withstanding vessel 18, which is fitted with a false hopper bottom 20. Surrounding a major portion of the side wall of the vessel 18 is an annular array of internally lined or jacketed refrigerated condenser coils 22, which are of sinuous construction in accordance with conventional practice. It is these coils that abstract the heat of melting and of vaporization from the liquid product. Refrigerant is circulated through the coils 22 from a refrigeration unit illustrated generally at 24, the details of which are conventional and form no part of the invention. In the refrigeration system, a refrigerant inlet line 26 leads from the refrigeration unit to the condensing coil 22 by way of an expansion valve 28. The usual refrigerant return line 30 returns the refrigerant to the refrigeration unit, for condensing and recompressing in the usual and conventional manner. A temperature gauge 31 indicates the condenser coil temperature.

Since the drying process must be carried out under a relatively high vacuum, a vacuum pump 32 is connected to the vessel 18 of the freezing chamber 10 by means of an exhaust line 34. The vacuum pump primarily removes non-condensible gases, such as air or the like, because the water vapor sublimed from the product during the freezing operation is condensed to form frozen particles by the refrigeration coils 22. A gauge 35 indicates the pressure in the freezing chamber.

The liquid to be freeze dried, such as coffee extract, fruit juices, or the like is atomized into a fine spray within the freezing chamber 10 by a spray nozzle 38. The nozzle is supplied with the liquid by means of a pressure line 40, a pump 42, and a supply line 44, which receives liquid from a reservoir 46. A valve 45 controls the spray nozzle pressure, as indicated by a gauge 45a. The outlet of the freezing chamber 10 is in the form of a neck 48, which makes an air tight joint with a neck 50 projecting upwardly from the inlet end of the drying chamber 12.

In the embodiment of the invention being described, the drying chamber 12 comprises an elongated drying vessel or tube 52 closed at each end with removable end plates 53. In order to support the product particles during the drying operation, and to conduct the product through the drying chamber 12, a longitudinally extending pan or tray 54 is mounted in the drying chamber. The pan 54 is supported along its length on angularly disposed links 56 which are pivoted at their lower ends to the pan 54, and which are suspended from posts 57 projecting upwardly from longitudinally extending angle irons 58 that are mounted within the drying chamber 12. The pan 54 is given a vibratory movement by a vibrating drive assembly indicated generally at 60, the details of which will be described presently.

In order to condense the water vapor that is sublimed from the frozen particles of product P, as they progress along the pan 54 in the drying chamber, a condenser 62 is mounted below the pan 54. As shown, the condenser 62 is in the form of sinuous coils connected to a refrigerant inlet line 64, by means of an expansion valve 66. A refrigerant return line 68 is also provided, and the refrigerant is circulated through the condenser 62 by the refrigeration unit 24 previously referred to. The condenser temperature is measured by a thermal device and indicated on a gauge 69.

In order to supply the heat of sublimation necessary to dry the product P, as it progresses along the pan 54 in the drying chamber 12, a longitudinally extending heater assembly 70 is mounted above the pan 54. The heater 70 is in the form of an electrically heated blanket of conventional construction, and its temperature is measured by a thermal device and indicated on a gauge 71. A high degree of vacuum is maintained in the drying chamber 12 because of the connection to the freezing chamber 10 by way of necks 48 and 50, previously described. The vacuum pump 32 normally removes only non-condensible gases from the drying chamber 12, because the water vapor sublimed from the product P during the drying process is condensed by the condenser 62 in the drying chamber 12. The dried product falls through an outlet neck 74 of the drying chamber.

In order that the spray freeze drying system of the present invention can operate continuously, without admitting air to the system during the drying process, and without requiring an air seal between relatively moving parts, the air lock assembly 14, previously referred to, is provided at the delivery end of the drying chamber 12. The air lock assembly includes an isolating valve unit 78, having an air tight connection with the product outlet neck 74 of the drying chamber. The isolating valve unit 78 includes a manually operable butterfly valve 80, for closing off the outlet of the drying chamber when desired. Making an air tight connection with the isolating valve assembly 78 is a receptacle mounting pipe section 82, which mounts the receptacle 16 for the dried product. A receptacle clamp 84 holds the receptacle 16 in air tight communication with the receptacle mounting pipe section 82.

Connected to the pipe section 82 is a combined pre-exhaust and air inlet line 86, which is also connected to a T 88. One branch of the T connects to a vacuum line 90 by means of an manually operable vacuum valve 92. The vacuum line 90 makes a connection to the main vacuum line 34, and hence is in communication with the vacuum pump 32 previously referred to. In order to accommodate removal of the receptacle 16 when the latter is filled with the dried product, an air inlet line 94 connects to the other branch of the T 88, and is controlled by a manually operable air inlet valve 96. A butterfly valve 97 in the main vacuum line 34 can be closed to isolate the air lock 14 from the freezing and drying chambers.

Details of the mechanism for mounting and vibrating the pan 54 will now be described. The angle irons 58 for mounting the pan have been previously mentioned. Each angle iron 58 is mounted on a fixed channel 100, with the channel being removably supported by a bracket 102, secured to the side walls of the vessel 52 forming the drying chamber 12. In order to adjust the vector or impulse components of the vibration imparted to the pan 54, each of the angle irons 58, which mount the posts 57 previously referred to for supporting the pan links 56, is slidably adjustable along its respective channel 100. The angle irons 58 are clamped in their adjusted position by means of bolts 104, and the adjustment is accommodated by slots 106 (FIG. 4) in the angle irons 58, at each of the bolts 104.

In order to vibrate the pan 54, a transversely extending vibrator shaft 110 is provided at the delivery end of the drying chamber 12. The shaft 110 is rotatably mounted in posts 112, which project upwardly from the channels 100. As best seen in FIGURES 3 and 4, and eccentric 114 is provided on the shaft 110, which mounts one end of a connecting rod 116. The other end of the connecting rod 116 is connected to a pin 118, one end of which is mounted in a block 120 that is secured to the pan 54. The pin 118 also is pivotally connected to the lower end of one of the pan supporting links 56, previously referred to, this being the link adjacent the connecting rod 116. The upper end of the link 56 is pivotally mounted in a post 57, previously described, by means of a pin 122. Each of the links 56 except that at the connecting rod 116 has its lower end pivotally mounted by means of a pin 118a, in a block 120a, secured to the pan 54, as best seen in FIGURES 2 and 4. The blocks 120 and 120a are welded or otherwise attached to side walls 124 of the pan. As shown in FIGURES 2 and 4, the bottom of the pan has longitudinal corrugations 126 formed along its length, to stiffen the pan longitudinally of the drying chamber.

Means are provided to rotate the pan vibrator shaft 110 at a suitable speed, for a given throw of the eccentric 114. In order to rotate the shaft 110, one end section 127 thereof projects through a gland 128 (FIGURES 2 and 4) which provides an airtight rotary joint for the shaft. This end section 127 of the shaft 110 has secured thereto a sprocket wheel 130 (FIGURES 1, 2 and 4), and is coupled to the main section of the shaft 110 by a coupling 129. Means for rotating the sprocket wheel 130 are shown in FIGURE 1. A chain 132 is trained around the sprocket wheel 130 and around a sprocket pinion 134. The pinion 134 is driven by a variable speed belt drive assembly such as a Reeves drive, indicated generally at 136. These assemblies of axially shiftable pulley units are well known in the art, and the details thereof form no part of the present invention. The variable speed drive assembly is power driven by a combined motor and gear reduction unit 138, forming part of the vibrating drive assembly 60 previously referred to. The coupling 129 permits removal of the channels 100, which carry the angle irons 58 and the pan.

As mentioned, a heater 70 is provided to supply the heat of sublimation necessary for the drying process. As seen in FIGURES 2 and 3, the heater 70 includes an electric blanket 140, which is in the form of resistance heating wires embedded in a sheet of silicone rubber. The heating element 140 is cemented to a backing plate 142 which is mounted within the drying chamber 12 by means of longitudinally extending brackets 144. The wire leads 145 from the blanket 140 are connected to a source of electric current, and the current flow is adjusted in the conventional manner by means not shown, in order to provide the desired blanket temperature.

As best seen in FIGURE 3, at the delivery end of the pan 54, a funnel like hopper 146 is fitted into the drying chamber 12 for receiving the dried product P, as the product is vibrated out of the delivery end of the pan 54. Hopper 146 delivers the dried product to the outlet neck 74, and into the air lock assembly 14, previously described in detail.

The operation of the spray freeze drying system of the present invention will now be briefly described.

Referring to FIGURE 1, assume that the apparatus has been shut down. An empty receptacle 16 will be fitted to the air lock 14, and the vacuum pump 32 started up with butterfly valves 80 and 97 open, the air inlet valve 96 to the air lock 14 closed, and the air lock vacuum valve 92 closed. The refrigeration unit is started up. The heaters are turned on and a water spray introduced through the nozzle to prevent overheating the pans. In a short time the non-condensible gases are exhausted from the freezing chamber, the drying chamber, the air lock and the receptacle, and the pressure within the freezing chamber 10 and drying chamber 12, as indicated by gauges 35 and 72 respectively, will be equalized at a very low value, considerably below the triple point pressure. The pan vibrating motor 138 is now turned on, the product liquid pump 42 started, and the liquid supply valve 45 adjusted to produce the desired spray pressure for the nozzle 38, as indicated by the gauge 45a. The spray freeze drying process of the present invention now begins. The particles of atomized liquid emerge in a cone like envelope of finely atomized particles. These particles are directed upwardly in the freezing chamber 10, and due to the low pressure now existing within the freezing chamber, most of the particles freeze soon after leaving the nozzle 38, but they do not freeze at the nozzle itself. Most of the particles of the product will have been frozen before they strike the wall or jacket of the condenser 22, with which they bounce off the wall and start falling down towards the outlet neck 48 of the freezing chamber. Particles that are not fully frozen when they reach the wall of the condenser, 22 will soon freeze thereafter, and all particles will have been completely frozen by the time they fall to the hopper 20 at the bottom of the freezing chamber. These completely frozen particles fall directly into the input end of the vibrating pan 54. The action of the pan drive assembly 60, and the angular relation of the links 56, are such as to cause the particles P to advance along the pan 54 toward the delivery end of the drying chamber 12 in a progressive motion illustrated diagrammatically in FIGURE 3.

As the particles advance along the pan 54, the heat of sublimation is supplied by the heater 70, and the sublimed vapor is condensed directly in the chamber, by the internal condenser 62 in the drying chamber. The refrigeration loads for the condenser 62 in the drying chamber and 22 in the freezing chamber are adjusted so that the pressures within these chambers are substantially equal. It is particularly important that the pressure within the drying chamber 12 not substantially exceed that which exists in the freezing chamber. If such were the case, sublimed water vapor could flow upwardly through the inlet neck 50 of the drying chamber, and the outlet neck 48 of the freezing chamber, thereby entraining frozen particles P attempting to fall into the drying chamber from the freezing chamber. Since approximately 20% of the water in the product is removed during the freezing process, in the freezing chamber 10, the drying chamber 12 requires correspondingly less refrigeration per pound of liquid starting product, than would be required if the product were introduced in the state of pre-frozen particles.

When the particles reach the end of the pan 54, they are vibrated out of the end of the pan, as indicated in FIGURE 3, and into the funnel hopper 146, whereupon they fall through the air lock 14 into the receptacle 16.

When the receptacle 16 has been filled to the desired extent, the airlock and valving system permits changing receptacles without breaking the vacuum in the freezing and drying chambers. First the butterfly valve 97 in the vacuum line 34 is closed to isolate the airlock. In order to replace the receptacle 16, the vacuum valve 92 must be closed, but as previously mentioned, this valve will normally be closed during normal operation. However, the manually operable butterfly valve 80 in the air lock 14, which was opened to allow particles to drop into the receptacle 16, will now be closed to completely isolate the airlock from the interior of the drying chamber 12. After the butterfly valve 80 has been closed, the air inlet valve 96 can be opened to equalize the pressure within the receptacle 16, which can now be removed and replaced by an empty receptacle.

As soon as the new receptacle is mounted in place in the airlock 14, the air inlet valve 96 is again closed, and now the vacuum valve 92 leading to the airlock 14 is opened to exhaust the receptacle and the airlock, before the butterfly valve 80 is re-opened. Finally, the butterfly valve 97 in the main vacuum line 34 is re-opened. During this time, which is a very short period of time, dried product is accumulating above the butterfly valve 80. As soon as the preceding steps have been completed, the butterfly valve 80 can be re-opened to re-establish communication between the drying chamber 12 and the receptacle 16, by way of the airlock 14. As mentioned, the air inlet valve 96 will have been previously closed, and the vacuum valve 92 for the airlock can now be closed, because vacuum is now established directly through the airlock by way of the freezing chamber 10, drying chamber 12, and the main vacuum line 34.

Experience with the freeze drying of solid-bearing liquids, such as coffee extract, has shown that the geometry of the link mounting for the pan 54 is somewhat critical. If these geometry factors are under-selected, the product will not move fast enough through the drying chamber to give the desired short residence time within the chamber. If the factors are over-selected, the product will be vibrated out of the pan or if not, will advance too rapidly through the drying chamber so that the product will not be completely dried by the time it reaches the airlock 14, at the delivery end of the pan. With heat sensitive products such as instant coffee, which also tend to be somewhat sticky, certain critical dimensions and speeds for the vibrating assembly have been developed. In the apparatus of the present invention, it has been found that angle $a$ (FIG. 5) which the links 56 make with the horizontal plane should be substantially 65°. As a result, the average direction of pan motion, indicated by the arrow $v$ is at the same angle $a$ of 65°, with the vertical plane. Although the length of the links 56 is not critical, at the angle $a$ of 65°, a length of 2″ for the links has been satisfactory. The horizontal amplitude of vibration indicated at $x$, FIG. 5, is ¼″ total, which means that the eccentric 114 has a ⅛″ offset or stroke. The speed of rotation of the vibrator shaft 110 is 500 r.p.m. This imparts a maximum horizontal acceleration to the particles or product P of 0.80 g., and a maximum vertical acceleration to the particles of 0.37 g. Thus, although the particles progressively advance along the pan, they do not jump or dance clear of the pan, or from one another, during the process.

The conveying action may be described as follows:

When the pan is moved down and rearwardly, the product follows the pan down, but not rearwardly, because the friction force between the pan and the product is insufficient to shift the product mass rearwardly to the full extent of pan motion. However, when the pan is moved up and forwardly, the friction force is augmented, and the product mass has imparted thereto a forward motion that is significantly greater than its retrograde motion. The path of the product in space resembles a longitudinally compressed epicycloid. The conveyor of the present invention provides a combined conveying and agitating action, and yet the action on the particles is a gentle one.

By way of an example, the optimum operating conditions will now be given for a system and process embodying the present invention, when employed for the spray freeze drying of instant coffee extract. Of course the sizes of the system and the throughput of the product are directly related. The present example will be described in connection with the system shown in FIG. 1, wherein the freezing chamber 10 is approximately 5 feet in diameter and 6 feet high. The pan 54 is approximately 16 feet long and one foot wide and the drying chamber 12 is 2 feet in diameter.

As to the solid content of the coffee extract, it has been found that best results are obtained when the solids content is about 20% by weight. Difficulties with sticking and performance are encountered if the solid content reaches 25% by weight. It is uneconomical and unnecessary to operate with a starting coffee extract liquid in which solids content is less than 20% by weight, because unnecessary evaporation of water is required.

It has been found that the refrigerant temperature should be adjusted to maintain a pressure in the freezing and drying chambers in the order of 250 microns, as indicated in the curve of FIG. 6. If the pressure in the drying chamber is permitted to exced 270 microns, troubles with sticking of the product to the pan are encountered. Of course, pressures lower than 250 microns are possible, if increased refrigeration is supplied. An operating pressure of about 250 microns is selected as the optimum all around operating pressure. Although any appreciable lowering of the pressure below 250 microns permits decreasing the residence time of the product within the drying chamber by supplying more heat to the product, as mentioned, this increases the refrigeration load, and so when balancing these two effects, the pressure range of 250 to 270 microns referred to, which gives a residence time in the order of 40 seconds, is found to produce the best overall results. The 40 second residence time is short enough to prevent heat damage to the product, and long enough to insure 100% drying during the process.

The spray nozzle 38 (or nozzles in a larger system), and the pressure range in which it operates, are selected to give an evaporation rate in the order of 0.35 lb. per hour, per square foot of pan surface in the drying chamber 12. A nozzle made particularly for the spray drying of products is the Type SX Spray Drying Nozzle, manufactured by Spraying Systems Co., of Bellwood, Ill. In the system described, this nozzle is operated at a pressure of 200 p.s.i.g. from the pump 42, as adjusted by the liquid inlet valve 45, and indicated on the gauge 45a.

The temperature of the refrigerant in the condensers 22 and 62 is maintained at −50° F., or thereabouts. If the temperature of the refrigerant is allowed to become as high as −30° F., difficulties with sticking and long residence time are encountered. Any temperature lower than −50° F., merely requires additional refrigeration, the cost of which is not overbalanced by suitably decreased residence time of the product.

The temperature of the heater 70 is maintained at approximately 300° F., and a lowered temperature unnecessarily increases the residence time of the product, but if the temperature is permitted to reach 325° F., the product sticks to the conveyor. The product gradually becomes warmer as it reaches the delivery end of the pan 54. A delivery temperature of 150° F. at the pan is selected. This temperature is measured by a thermocouple (not shown) on the delivery end of the pan.

As previously mentioned, the pan 54 is vibrated at 500 cycles per minute (500 r.p.m. of shaft 110) over a horizontal stroke $x$ of ¼", and with the links 56 forming an angle of 65° with the horizontal plane.

When all of these factors have been taken into consideration in the operation of the system as described, the aforesaid very short residence time of 40 seconds produces dried particles of instant coffee which have excellent taste and aroma, when reconstituted with water in the usual manner. The particle size of the coffee is in the order of microns which provides a quickly soluble and appealing product.

Although a single long pan has been described, a number of vertically spaced shorter pans could be employed, with each pan feeding the pan below, so that the material is conveyed back and forth in the drying chamber during drying. The vibrating conveyor described permits close vertical stacking of such pans.

Having presented a detailed description of the invention so that those skilled in art may practice the same, we claim:

1. A process for freeze drying the water content out of a solids-bearing liquid food material embodying volatile aromatics to convert the solids content into a completely dried but aromatic product; said process comprising the steps of spraying the liquid into a vacuum freezing chamber over a free, unobstructed path, maintaining a total pressure in the chamber below the triple point pressure of water by removing non-condensible gases from the freezing chamber and by condensing directly in the freezing chamber the water vapor sublimed from the liquid spray during its transit along said path, adjusting the rate of spray relative to the rate of water vapor evolution from the spray and to the rate of condensation of the evolved water vapor so that the liquid remaining in the spray freezes into solids-bearing ice particles while the spray is in transit along said path; gravity feeding the frozen particles into a connected elongate drying chamber, advancing the frozen particles along the drying chamber, supplying the heat of sublimation to the frozen particles in the chamber by heating them radiantly from above, and within the chamber, shielding a zone within the chamber from said radiant heat, condensing directly in said heat-shielded zone of the drying chamber, the water vapor sublimed from the particles during drying, removing non-condensable gas from the drying chamber, and removing the dried particles from the drying chamber without admitting air to the chamber.

References Cited
UNITED STATES PATENTS

| | | | |
|---|---|---|---|
| 2,431,496 | 11/1947 | Natelson et al. | 99—71 |
| 2,616,604 | 11/1952 | Folsom | 53—22 |
| 2,751,687 | 6/1956 | Colton | 34—5 |
| 2,853,796 | 9/1958 | Sanders | 34—1 |

OTHER REFERENCES

Greaves, R. I. N., New York Academy of Science Annals, vol. 85, Apr. 13, 1960, pages 682–688.

MAURICE W. GREENSTEIN, *Primary Examiner.*

A. LOUIS MONACELL, *Examiner.*